(12) United States Patent
Navabi et al.

(10) Patent No.: US 11,274,814 B2
(45) Date of Patent: Mar. 15, 2022

(54) HOLDERS FOR A LIGHT SOURCE

(71) Applicant: L.J. Star, Incorporated, Twinsburg, OH (US)

(72) Inventors: Aarash Navabi, Walpole, MA (US); Michael Sadaway, Norwood, MA (US)

(73) Assignee: L.J. Star, Incorporated, Twinsburg, OH (US)

(*) Notice: Subject to any disclaimer, the term of this patent is extended or adjusted under 35 U.S.C. 154(b) by 0 days.

(21) Appl. No.: 17/330,475

(22) Filed: May 26, 2021

(65) Prior Publication Data

US 2021/0278066 A1 Sep. 9, 2021

Related U.S. Application Data

(62) Division of application No. 16/900,040, filed on Jun. 12, 2020, now Pat. No. 11,029,006.

(60) Provisional application No. 62/862,301, filed on Jun. 17, 2019.

(51) Int. Cl.
*F21V 21/088* (2006.01)
*F16B 2/22* (2006.01)
*F21V 21/26* (2006.01)
*F16M 13/02* (2006.01)

(52) U.S. Cl.
CPC .............. *F21V 21/088* (2013.01); *F16B 2/22* (2013.01); *F16M 13/022* (2013.01); *F21V 21/26* (2013.01); *F16M 2200/06* (2013.01)

(58) Field of Classification Search
CPC ............ F16B 2/20–248; F16M 13/022; F16M 2200/06–061; F21V 21/08–0885; F21V 21/26
USPC .................................................. 362/396, 457
See application file for complete search history.

(56) References Cited

U.S. PATENT DOCUMENTS 8,449,145 B1* 5/2013 Berry ......................... F21S 4/00
                                                362/249.02
9,746,163 B1* 8/2017 Acosta, Sr. ............. F21S 4/001

* cited by examiner

*Primary Examiner* — Jason M Han
(74) *Attorney, Agent, or Firm* — Edwin A. Sisson, Attorney at Law, LLC; Jeffrey J. Banyas (57) ABSTRACT

It is described herein various embodiments of a holder for a light source. In some embodiments, the holder comprises a first arm and a second arm with each arm attached to a pivot member (300) having a pivot member central axis. In other embodiments, the holder comprises a housing attached to a first planar surface of a mounting base with a first bracket attached to a second planar surface of the mounting base proximate with a mounting base first end and a second bracket attached to the second planar surface of the mounting base proximate with a mounting base second end which is opposite the mounting base first end.

7 Claims, 11 Drawing Sheets

HOLDERS FOR A LIGHT SOURCE

CROSS REFERENCES AND PRIORITIES

This Application claims priority from U.S. Provisional Application No. 62/862,301 filed on 17 Jun. 2019 and U.S. application Ser. No. 16/900,040 filed on 12 Jun. 2020, the teachings of each of which are incorporated herein by reference in their entirety.

BACKGROUND

Equipment used in chemical, pharmaceutical, oil and gas, mining, food and beverage production, and related manufacturing industries often require visual flow indicators or sight flow indicators to allow an operator to visually observe and monitor the flowing fluid. Such devices frequently require illumination from a light source to allow the operator to see through the visual flow indicator or sight flow indicator.

This can be as simple as putting a flashlight behind a transparent pipe. The limitation of the "simple flashlight" is variable intensity and the introduction of background light and visual interference from background light.

Many solutions have been proposed for illuminating a visual flow indicator or sight flow indicator. The simplest solution is to manufacture the visual flow indicator or sight flow indicator with an integral light source. Such light sources cannot be moved to illuminate a different area, and are difficult to maintain when the light source burns out or experiences other electrical problems.

Several solutions have been proposed involving a light source which is bolted, screwed, or otherwise fastened to the visual flow indicator or the sight flow indicator by a fastener which passes through a light source mounting apparatus and into the visual flow indicator or sight flow indicator. Once fastened in place, the light source can be removed by un-fastening the light source mounting apparatus in order to repair or replace the light source, or in the event the operator needs to move the light source to a different position. This also requires that the equipment contain a series of different screw holes or other areas to which the light source mounting apparatus can be fastened as the light source is moved from one position to another.

There is therefore a need for an article that can quickly mount a light source to a visual flow indicator or sight flow indicator without the use of added bolts, screws, or other fasteners that must extend into holes that would require modifications be made to the visual flow indicator or sight flow indicator to include such holes. By eliminating the need for added bolts, screws, or other fasteners and the modifications to the visual flow indicator or sight flow indicator that are required by way of such fasteners, the light source can be easily moved from one position to another in order to illuminate different areas on the apparatus in question, or to repair or replace the light source.

SUMMARY

Described herein is a holder for a light source. The holder for a light source may comprise a first arm, a second arm, and a pivot member. The first arm may have a first arm first end and a first arm second end opposite the first arm first end. The first arm first end may comprise a first clip. The second arm may have a second arm first end and a second arm second end opposite the second arm first end. The second arm first end may comprise a second clip. The pivot member may have a pivot member central axis. The first arm second end may be connected to the pivot member at a first location. The second arm second end may be connected to the pivot member at a second location. The first and the second arm may be configured to pivot around the pivot member central axis. The pivot member may be configured to frictionally engage with the light source.

In some embodiments, the first arm and the first clip may be made of a first single integral piece of material. Similarly, in some embodiments, the second arm and the second clip may be made of a second single integral piece of material. In certain embodiments, the first arm, the second arm, and the pivot member may be made of one integral piece of material.

In certain embodiments, the first clip may be slideably connected to the first arm. Similarly, in some embodiments, the second clip may be slideably connected to the second arm.

In some embodiments, the pivot member may comprise a first pivot member section connected to the first arm second end at the first location, and a second pivot member section connected to the second arm second end at the second location.

In some such embodiments, the first pivot member section may be a first cylinder having a first minor inside diameter, a first major inside diameter, and a first outside diameter. In certain such embodiments, the first location at which the first arm second end is connected to the first pivot member section is located on the first outside diameter of the first cylinder.

In certain such embodiments, the second pivot member section may be a second cylinder having a second minor inside diameter, a second major inside diameter, and a second outside diameter. In some such embodiments, the second location at which the second arm second end is connected to the second pivot member section is located on the second outside diameter of the second cylinder.

In some embodiments, the first pivot member section may comprise a first pivot member protrusion, the second pivot member section may comprise a second pivot member recess, and the first pivot member section protrusion may mate with the second pivot member section recess to form the pivot member. In certain such embodiments, the first pivot member section protrusion may comprise a ridge, the second pivot member section recess may comprise a groove, and the ridge may be adapted to frictionally engage the groove.

In certain embodiments, the first pivot member section may comprise a first pivot member recess, the second pivot member section may comprise a second pivot member protrusion, and the first pivot member section recess may mate with the second pivot member section protrusion to form the pivot member. In some such embodiments, the first pivot member section may comprise a groove, the second pivot member protrusion may comprise a ridge, and the ridge may be adapted to frictionally engage the groove.

The first clip may be configured to frictionally engage with a first mounting bolt of a visual flow indicator or sight flow indicator. The second clip may be configured to frictionally engage with a second mounting bolt of a visual flow indicator or sight flow indicator.

Also described herein is a holder for a light source comprising a housing, a mounting base, a first bracket, and a second bracket.

The housing may comprise a housing first end, a housing second end opposite the housing first end, a housing longitudinal axis running from the housing first end to the housing second end, a housing outer surface, and a housing first end access from the housing first end to a cavity.

The mounting base may comprise an outer perimeter defining a first planar surface and a second planar surface opposite the first planar surface. The mounting base may also comprise a mounting base first end, and a mounting base second end opposite the mounting base first end.

The first bracket may comprise a first bracket base having a first bracket base first end, a first bracket base second end, a first bracket inner surface, and a first bracket outer surface. The first bracket may also comprise a first bracket first member extending from the first bracket inner surface at the first bracket base first end. The first bracket may further comprise a first bracket second member extending from the first bracket inner surface at the first bracket second end.

The second bracket may comprise a second bracket base having a second bracket base first end, a second bracket base second end, a second bracket inner surface, and a second bracket outer surface. The second bracket may also comprise a second bracket first member extending from the second bracket inner surface at the second bracket base first end. The second bracket may further comprise a second bracket second member extending from the second bracket inner surface at the second bracket second end.

A first portion of the housing outer surface may be connected to the first planar surface between the mounting base first end and the mounting base second end. The first bracket outer surface may be connected to the second planar surface proximate with the mounting base first end. The second bracket outer surface may be connected to the second planar surface proximate with the mounting base second end. An opening may pass from the second planar surface through the first planar surface and a portion of a sidewall of the housing.

In some embodiments, the cavity may not extend all the way to the housing second end. Alternatively, the housing may further comprise a housing second end access, and the cavity may extend from the housing first end to the housing second end.

In certain embodiments, the housing may comprise an opaque material.

In some embodiments, the first bracket first member may comprise a first threaded hole substantially parallel with the housing longitudinal axis with the first threaded hole configured to receive a bolt. In certain embodiments, the first bracket second member may comprise a second threaded hole substantially parallel with the housing longitudinal axis with the second threaded hole configured to receive a bolt.

DETAILED DESCRIPTION

This specification is best understood by referring to the various Figures. Reference will now be made to the various Figures in which, unless otherwise noted, like numbers refer to like structures. As described herein and in the claims, the following numbers refer to the following structures as noted in the Figures.

10 refers to a holder.
20 refers to a light source.
21 refers to a light source outside diameter.
22 refers to a lighting element
24 refers to a power connector.
30 refers to a first mounting bolt.
40 refers to a second mounting bolt.
100 refers to a first arm.
110 refers to a first arm first end.
120 refers to a first arm second end.
130 refers to a first clip.
135 refers to a first clip protrusion.
140 refers to a first arm hole.
200 refers to a second arm.
210 refers to a second arm first end.
220 refers to a second arm second end.
230 refers to a second clip.
235 refers to a second clip protrusion.
240 refers to a first arm hole.
300 refers to a pivot member.
305 refers to a pivot member inside diameter.
310 refers to a pivot member central axis.
320 refers to a first pivot member section.
321A refers to a first minor inside diameter.
321B refers to a first major inside diameter.
321C refers to a second major inside diameter.
322 refers to a first outside diameter.
323 refers to a first pivot member section protrusion.
325 refers to a ridge.
330 refers to a second pivot member section.
331 refers to a second inside diameter.
332 refers to a second outside diameter.
333 refers to a second pivot member section recess.
335 refers to a groove.
340 refers to a plurality of ribs.
350 refers to a plurality of slots.
400 refers to a housing
410 refers to a housing first end.
420 refers to a housing second end.
430 refers to a housing longitudinal axis.
440 refers to a housing outer surface.
450 refers to a cavity.
460 refers to a housing first end access.
500 refers to a mounting base
510 refers to an outer perimeter.
520 refers to a first planar surface.
530 refers to a second planar surface.
540 refers to a mounting base first end.

550 refers to a mounting base second end.
600 refers to a first bracket.
610 refers to a first bracket base.
612 refers to a first bracket base first end.
614 refers to a first bracket base second end.
616 refers to a first bracket inner surface.
618 refers to a first bracket outer surface.
620 refers to a first bracket first member.
625 refers to a first threaded hole.
630 refers to a first bracket second member.
700 refers to a second bracket.
710 refers to a second bracket base.
712 refers to a second bracket base first end.
714 refers to a second bracket base second end.
716 refers to a second bracket inner surface.
718 refers to a second bracket outer surface.
720 refers to a second bracket first member.
725 refers to a second threaded hole.
730 refers to a second bracket second member.
800 refers to an opening.

Figure 1:
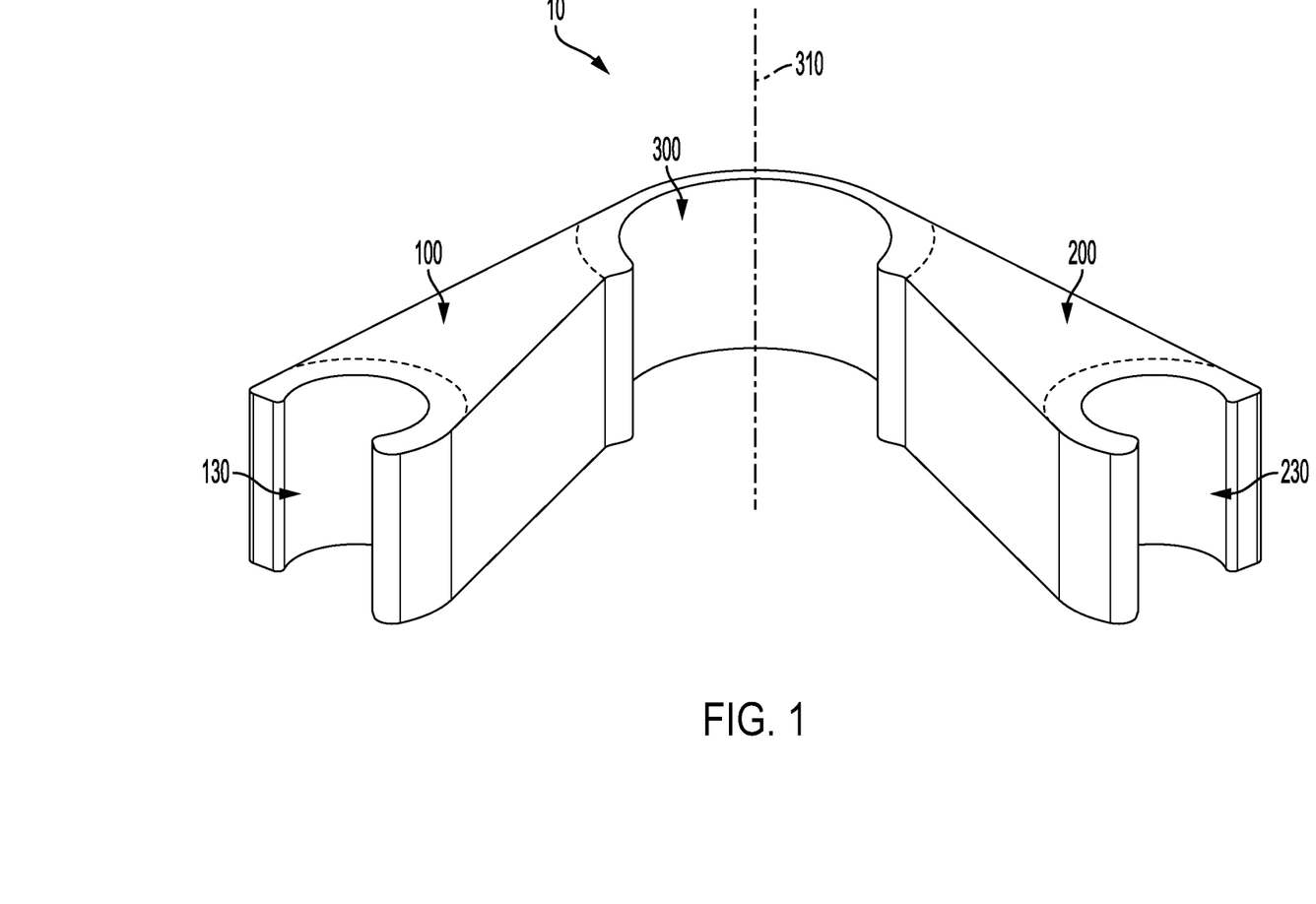
FIG. 1 is a perspective view of one embodiment of a holder for a light source.

FIG. 1 depicts a perspective view of one embodiment of a holder (10) for a light source. The embodiment of a holder comprises a first arm (100), a second arm (200), and a pivot member (300). The first arm comprises a first clip (130). Similarly, the second arm comprises a second clip (230). The pivot member has a pivot member central axis (310).

Figure 3:
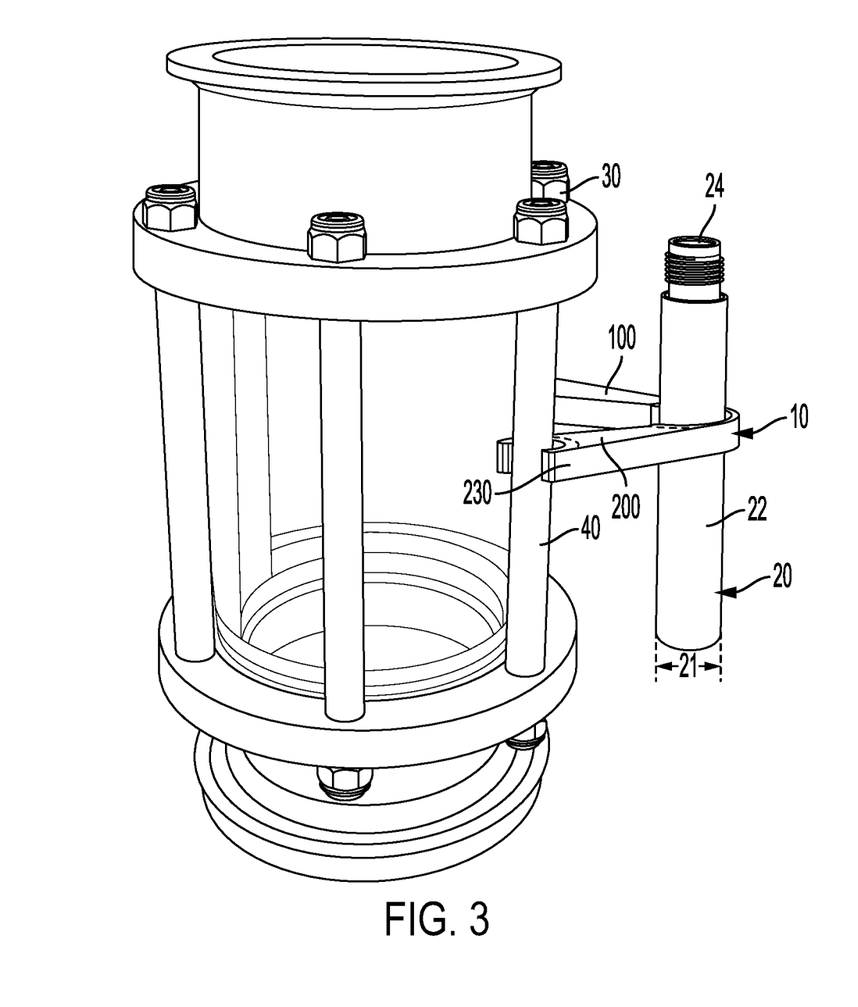
FIG. 3 is a perspective view of the embodiment of the holder for a light source shown in FIG. 1 in use holding a light source and mounted to two mounting bolts.

The light source (20 as shown in FIG. 3) may comprise a lighting element (22) attached to a power connector (24). The lighting element may contain one or more light emitting diodes attached a metal core printed circuit board and contained within a housing. The housing may have a cross sectional profile which is circular or substantially circular having a light source outside diameter (21) Preferably the housing will be made of a transparent or translucent material. The power connector may be electrically connected to the circuit board and may configured to attach to an external power source such as a battery or a hard wire to a power grid.

Figure 2:
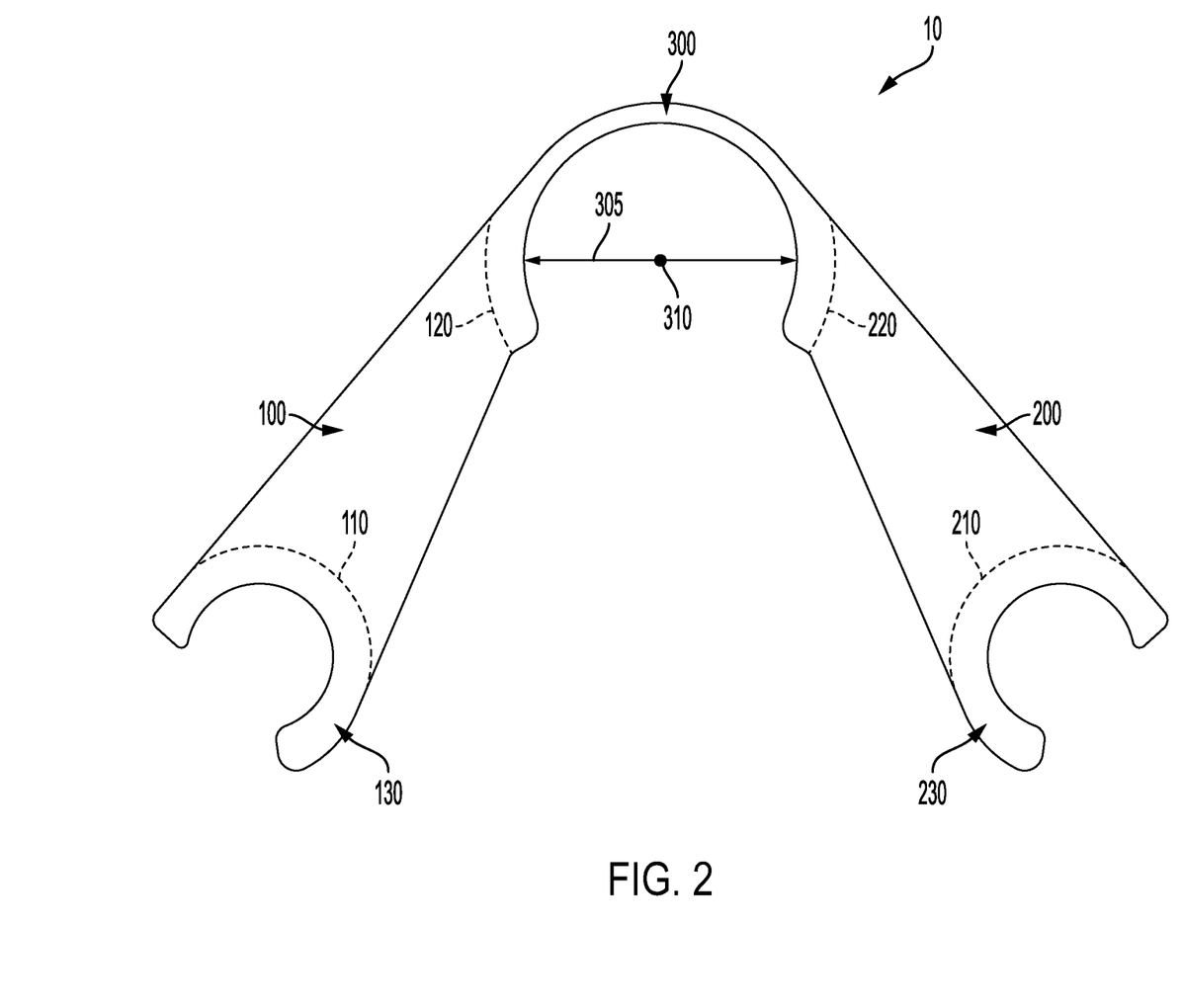
FIG. 2 is a top view of the embodiment of the holder for a light source shown in FIG. 1.

As shown in FIG. 2, which is a top view of the embodiment of a holder shown in FIG. 1, the first arm (100) has a first arm first end (110) and a first arm second end (120) opposite the first arm first end. The first arm first end comprises the first clip (130). Similarly, the second arm (200) comprises a second arm first end (210) and a second arm second end (220) opposite the second arm first end. The second arm first end comprises the second clip (230).

The first clip may be connected to the first arm first end by a variety of connection mechanisms. In some embodiments, as shown in FIG. 1 and FIG. 2, the first clip may be permanently connected to the first arm first end such as by welding the first clip to the first arm first end or by manufacturing the first clip and the first arm from one integral piece of material. Alternatively, the connection between the first clip and the first arm first end may be a slideable connection as described herein.

The second clip may be connected to the second arm first end by similar connection mechanisms as those used to connect the first clip to the first arm first end. Specifically, the second clip may be permanently connected to the second arm first end such as by welding the second clip to the second arm first end or by manufacturing the second clip and the second arm from one integral piece of material. Alternatively, the connection between the second clip and the second arm first end may be a slideable connection as described herein.

In the embodiment shown in FIG. 1 and FIG. 2, the first arm second end (120) is connected to the pivot member (300) at a first location on the outer surface of the pivot member. Similarly, the second arm second end (220) is connected to the pivot member at a second location on the outer surface of the pivot member. The first location and the second location are preferably at different positions on the outer surface of the pivot member. Preferably, the connection between the first arm second end and the pivot member, as well as the connection between the second arm second end and the pivot member are permanent connections such as a weld or manufacturing the first arm, the pivot member, and the second arm from one integral piece of material.

In the embodiment shown in FIG. 1 and FIG. 2, it is preferred that the pivot member (300) be made of a flexible material allowing the pivot member to deflect and rebound as the first arm (100) and the second arm (200) pivot around the pivot member central axis (310). This provides a frictional force for engaging the pivot member with a light source (20) to hold the light source in place as shown in FIG. 3. One of ordinary skill will recognize that this frictional force is provided by deflecting the pivot member to a point where the pivot member has an inside diameter (305 as shown in FIG. 2) equal to or substantially equal to the light source outside diameter (21 as shown in FIG. 3). This frictional force prevents or at least reduces the likelihood that the light source will slip or fall from the holder due to the force of gravity or other forces applied to the light source.

As the light source (20) is being held in place, the first clip (130) frictionally engages with a first mounting bolt (30) of a visual flow indicator or sight flow indicator as shown in FIG. 3. Simultaneously, the second clip (230) frictionally engages with a second mounting bolt (40) of a visual flow indicator or sight flow indicator as also shown in FIG. 3. The frictional engagement between the clips and the mounting bolts allows the light source to be maintained in close proximity to the visual flow indicator or sight flow indicator, while also allowing for easy removal without the need to disengage bolts, nuts screws, or other fasteners.

In use, the holder (10) may be mounted at any location along the length of the light source (20), the first mounting bolt (30) and the second mounting bolt (40). As shown in FIG. 3, the preferred location for the holder is approximately half way along the length of the light source with exactly half way along the length of the light source being more preferred.

While FIG. 3 shows the use of a single holder (10) for holding the light source (20) in place, one of ordinary skill will recognize that multiple holders may be used to hold a single light source in place. In some embodiments, the light source may be held in place by at least one holder. In other embodiments, the light source may be held in place by at least two holders. In still other embodiments, the light source may be held in place by at least three holders.

The embodiment shown in FIG. 3 shows the use of a single holder (10) which spans only a portion of the length of the first mounting bolt (30) and the second mounting bolt (40). In other embodiments, not shown, a single holder may span substantially all or all of the length of the first mounting bolt and/or the second mounting bolt.

Figure 4:
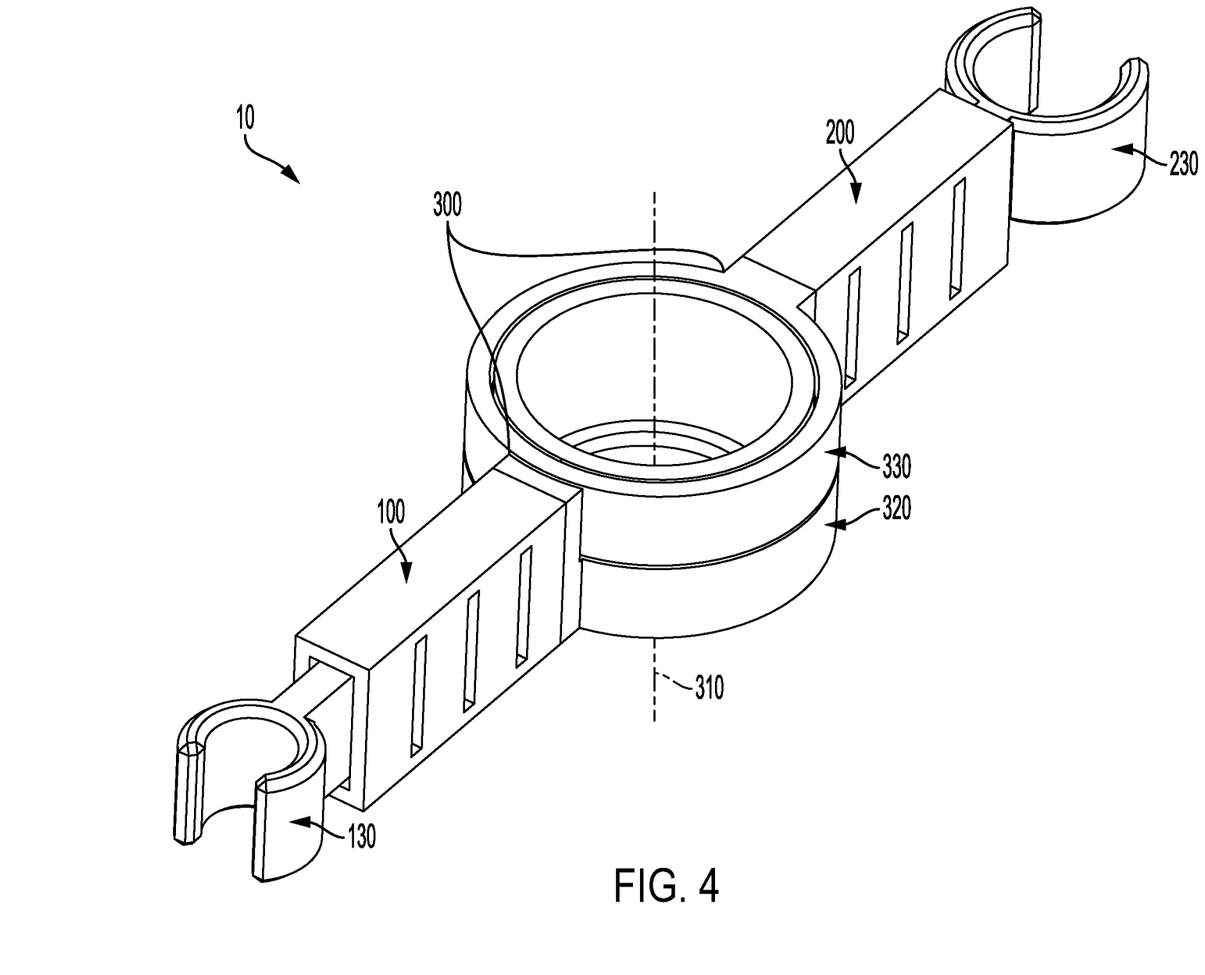
FIG. 4 is a perspective view of one embodiment of a holder for a light source.

Another embodiment of a holder (10) for a light source (20) is shown beginning in FIG. 4. The embodiment shown in FIG. 4, which is a perspective view, comprises a first arm (100), a second arm (200), and a pivot member (300). As shown in FIG. 4, the pivot member has a pivot member central axis (310).

FIG. 4 also shows the first arm (100) comprising a first clip (130), and the second arm (200) comprising a second clip (230). While FIG. 4 shows the first clip and the second clip being slideably engaged to their respective first arm and second arm as described herein, embodiments may exist in which one or both of the first clip and/or the second clip in the FIG. 4 holder are permanently attached to their respective first arm and/or second arm as described herein.

Figure 5:
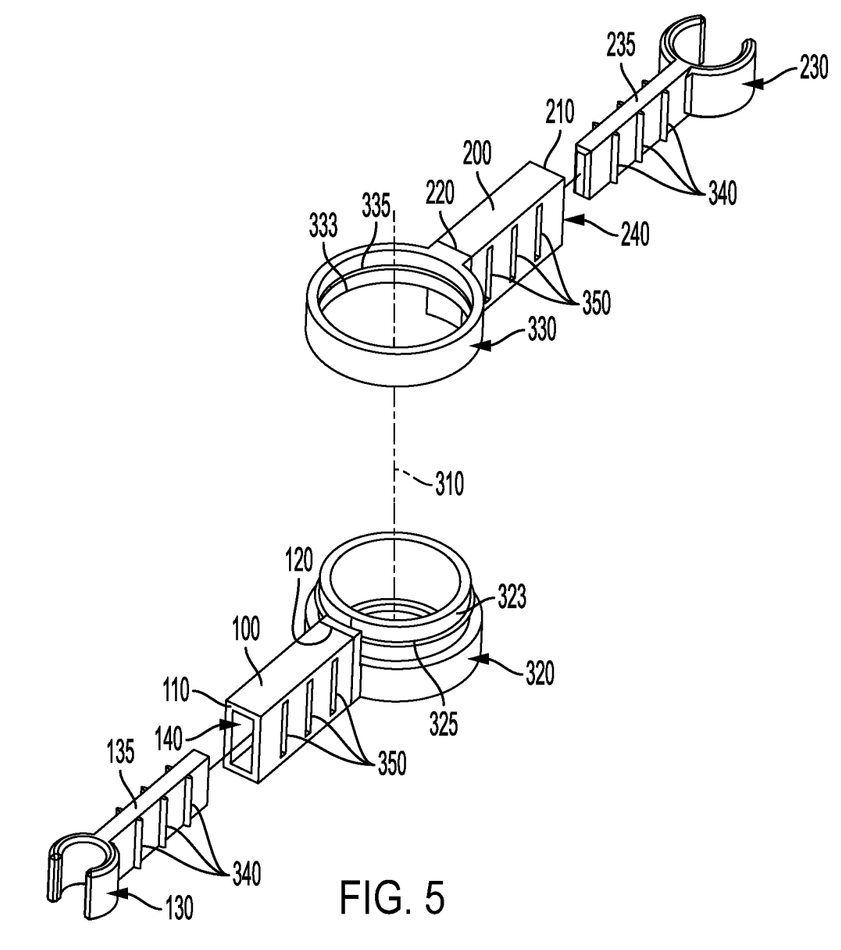
FIG. 5 is an exploded perspective view of the embodiment of a holder for a light source shown in FIG. 5.

FIG. 5, which is an exploded perspective view of the FIG. 4 embodiment, shows the first arm (100) having a first arm first end (110) and a first arm second end (120) opposite the first arm first end. Similarly, FIG. 5 shows the second arm (200) having a second arm first end (210) and a second arm second end (220) opposite the second arm second end.

As shown in FIGS. 4 and 5, the pivot member (300) comprises a first pivot member section (320) and a second pivot member section (330). As shown in FIG. 5 the first pivot member section may be a first cylinder having a first minor inside diameter (321A shown in FIG. 7), a first major inside diameter (321B shown in FIG. 7) and a first outside diameter (322 shown in FIG. 7). Similarly, the second pivot member section may be a second cylinder having a second inside diameter (331 shown in FIG. 7) and a second outside diameter (332 shown in FIG. 7).

FIG. 5 also shows the first pivot member section (320) having a first pivot member section protrusion (323). As shown in FIG. 5, the first pivot member section protrusion may be thought of as an area of the cylinder having a smaller outside diameter. FIG. 5 also shows the second pivot member section (330) having a second pivot member section recess (333). As shown in FIG. 5, the second pivot member section recess may be thought of as an area of the cylinder having a larger inside diameter. When assembled as shown in FIG. 4, the first pivot member section protrusion mates with the second pivot member section recess to form the pivot member (300) having the pivot member central axis (310). One of ordinary skill will recognize that, while the embodiments shown in the Figures have a first pivot member section protrusion mated to a second pivot member section recess, embodiments may exist where the configuration is reversed. That is, the second pivot member section may have a second pivot member section protrusion mated to a first pivot member section recess of the first pivot member section to form the pivot member having a pivot member central axis. When referring to the first pivot member section protrusion and the second pivot member section recess (or the second pivot member section protrusion and the first pivot member section recess) the term mated to means that the two components are similar in shape, circumference, and height to allow the protrusion to fit tightly or snuggly inside of the recess.

FIG. 5 also shows a ridge (325) and a groove (335). The ridge, when present, extends from the outer sidewall of the first pivot member section protrusion (323) (or the second pivot member section protrusion in embodiments where the first pivot member section comprises a first pivot member section recess). The groove, when present, extends into the inner sidewall of the second pivot member section recess (333) (or the first pivot member section recess in embodiments where the second pivot member section comprises a second pivot member section protrusion). When assembled, the ridge may frictionally engage with the groove allowing the first pivot member section to "snap" into the second pivot member section. This frictional engagement prevents, or reduces the likelihood of the first pivot member section becoming disengaged from the second pivot member section.

In the embodiment shown in FIG. 4 through FIG. 7, the first arm second end (120) is connected to the first pivot member section (320) at a first location on the first pivot member section outer surface. Similarly, the second arm second end (220) is connected to the second pivot member section (330) at a second location on the second pivot member section outer surface. Preferably, the connection between the first arm second end and the first pivot member section, as well as the connection between the second arm second end and the second pivot member section are permanent connections such as a weld or manufacturing the first arm and the first pivot member section, and/or the second arm and the second pivot member section from one integral piece of material.

FIG. 5 also shows additional details of the slideable connections between the first arm (100) and the first clip (130), and the second arm (200) and the second clip (230) respectively. As shown in FIG. 5, the first clip may comprise a first clip protrusion (135) while the first arm may comprise a first arm hole (140). The first clip protrusion preferably is of similar size and shape as the first arm hole to allow the first clip protrusion to pass into and out of the first arm hole. In some embodiments, the first arm hole will originate at the first arm first end (110) and extend all the way through the first arm to the first arm second end (120)—also known as a first arm through hole. In other embodiments, the first arm hole will be a first arm blind hole in which the first arm hole originates at the first arm first end and extends a portion of the way through the first arm without extending through to the first arm second end.

Similar to the first arm (100) and the first clip (130), there may be a slideable connection between the second arm (200) and the second clip (230). FIG. 5 shows the second clip which may comprise a second clip protrusion (235) while the second arm may comprise a second arm hole (240). The second clip protrusion preferably is of similar size and shape as the second arm hole to allow the second clip protrusion to pass into and out of the second arm hole. In some embodiments, the second arm hole will originate at the second arm first end (210) and extend all the way through the second arm to the second arm second end (220)—also known as a second arm through hole. In other embodiments, the second arm hole will be a second arm blind hole in which the second arm hole originates at the second arm first end and extends a portion of the way through the second arm without extending through to the second arm second end.

The slideable connection(s) may or may not include a locking mechanism as shown in FIG. 5. When present, the locking mechanism(s), may include a plurality of ribs (340) extending from an outer surface of the respective first clip protrusion (135) and/or second clip protrusion (235). The locking mechanism may also include a plurality of slots (350) passing through a sidewall of the first arm hole (140) and/or the second arm hole (240). When present, the ribs may deform as the first clip protrusion and/or the second clip protrusion passes into the respective first arm hole and/or second arm hole. When the protrusion has extended into the hole to a position where a rib is aligned with a slot, the rib will return to position and extend at least partially into the slot to frictionally engage the protrusion with the hole.

One of ordinary skill will recognize that, while the embodiments shown in FIG. 4 to FIG. 7 show the clips having protrusions and the arms having holes, the configuration can be easily reversed. For instance, the first clip (130) may comprise a first clip sleeve having a first clip sleeve hole configured to pass over the first arm (100) from the first arm first end (110) toward the first arm second end (120). Similarly, the second clip (230) may comprise a second clip sleeve having a second clip sleeve hole configured to pass over the second arm (200) from the second arm first end (210) toward the second arm second end (220).

Figure 6:
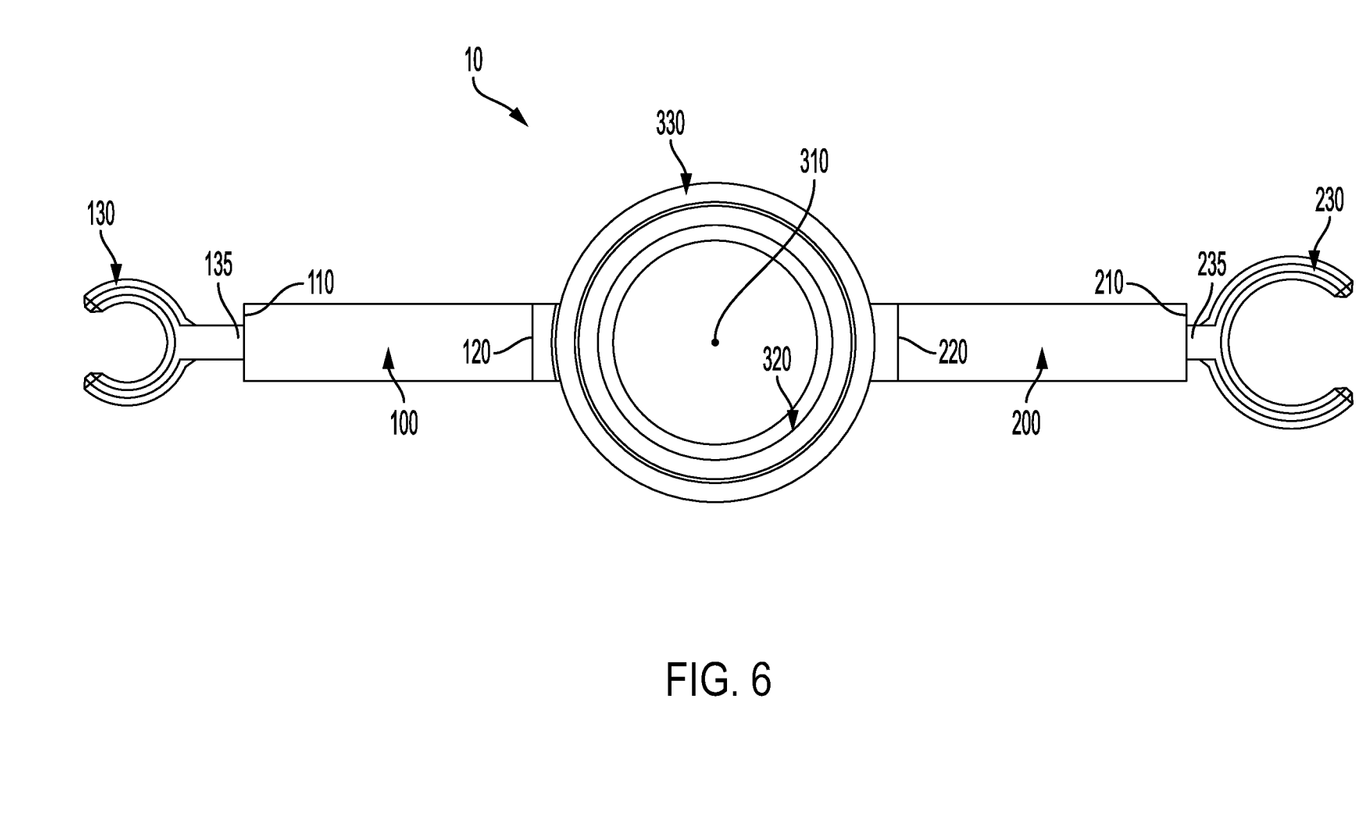
FIG. 6 is a top view of the embodiment of a holder for a light source shown in FIG. 5.

FIG. 6 is a top view of the assembled holder embodiment shown in FIG. 4 and FIG. 5. FIG. 6 shows additional details of the slideable engagement between respective arms and clips, as well as the mating of the first pivot member section (320) to the second pivot member section (330).

Figure 7:
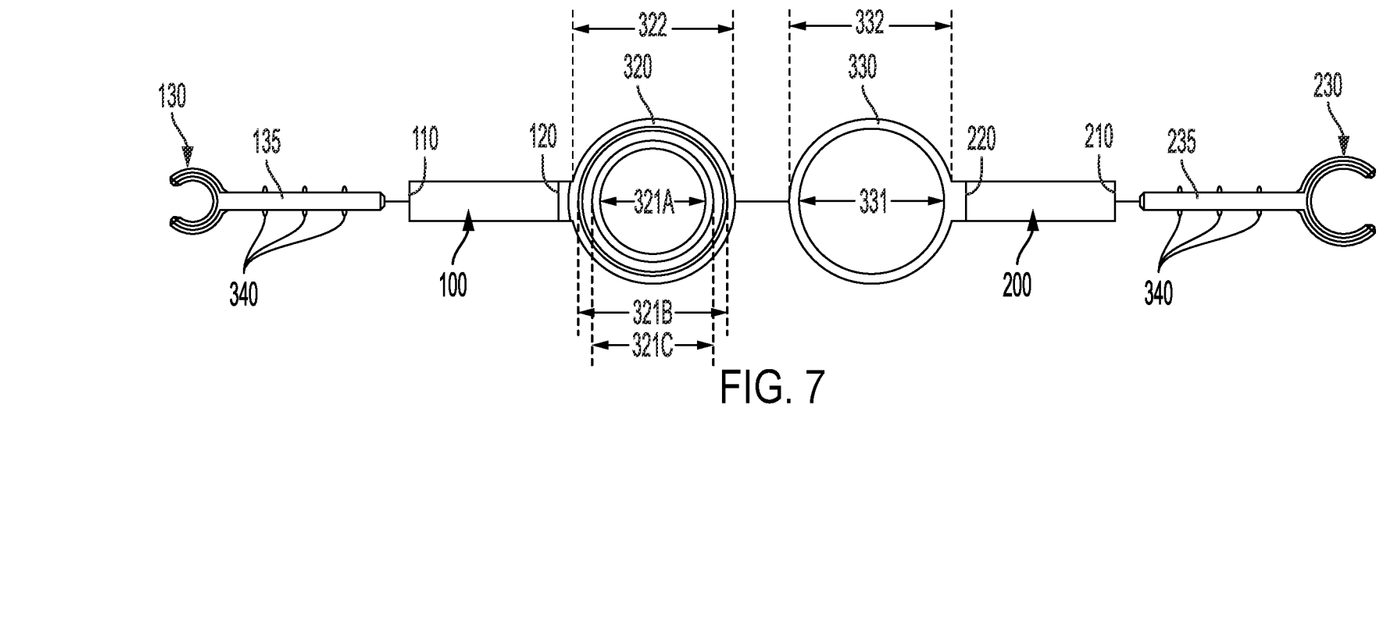
FIG. 7 is an exploded top view of the embodiment of a holder for a light source shown in FIG. 5.

FIG. 7 is an exploded top view of the holder embodiment shown in FIG. 4 to FIG. 6. FIG. 7 shows additional details of the first minor inside diameter (321A), the first major inside diameter (321B), and the first outside diameter (322) of the first pivot member section (320) as well as the second inside diameter (331) and the second outside diameter (332) of the second pivot member section (330). FIG. 7 also shows a second major inside diameter (321C) of the first pivot member section. In preferred embodiments, this second major inside diameter may be equal to or substantially equal to the light source outside diameter (21 as shown in FIG. 8).

Figure 8:
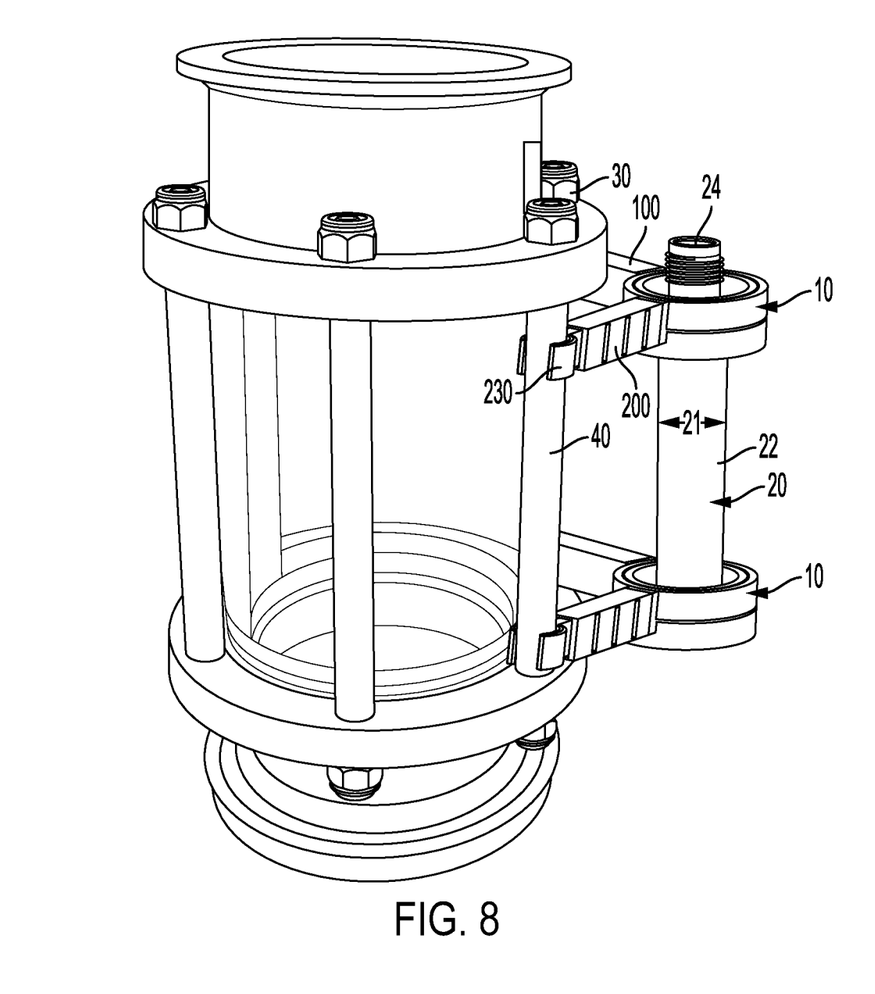
FIG. 8 is a perspective view of the embodiment of the holder for a light source shown in FIG. 5 in use holding a light source and mounted to two mounting bolts.

FIG. 8 shows the light source (20) being held in place by a pair of holders (10). One holder of the pair of holders may be located at an end of the light source proximate to the power connector (24) while the other holder may be located at an end of the light source opposite the power connector. The holder located at the end of the light source opposite the power connector may be oriented such that the end of the light source opposite the power connector rests against the first minor inside diameter (321A) with the first major inside diameter (321B) and the second inside diameter (331) being equal to or slightly larger than the light source outside diameter (21) so that a first portion of the light source length fits inside the first major inside diameter and the second inside diameter. The first minor inside diameter may be slightly smaller than the light source outside diameter to prevent or reduce the likelihood of the light source slipping or falling out of the holder. By "slightly larger than" it is meant that the first major inside diameter and/or the second inside diameter are at least 0.01 cm, at least 0.03 cm, or at least 0.05 cm greater than the light source outside diameter. By "slightly smaller than" it is meant that the first minor inside diameter is at least 0.01 cm, at least 0.03 cm, or at least 0.05 cm less than the light source outside diameter.

The holder located at the end of the light source (20) proximate to the power connector (24) may be oriented such that the power connector rests inside of the first minor inside diameter with the first major inside diameter and the second inside diameter being equal to or slightly larger than the light source outside diameter so that a second portion of the light source length fits inside the first major inside diameter and the second inside diameter.

As the light source (20) is being held in place, the first clip (130) frictionally engages with a first mounting bolt (30) of a visual flow indicator or sight flow indicator as shown in FIG. 8. Simultaneously, the second clip (230) frictionally engages with a second mounting bolt (40) of a visual flow indicator or sight flow indicator as also shown in FIG. 8. The frictional engagement between the clips and the mounting bolts allows the light source to be maintained in close proximity to the visual flow indicator or sight flow indicator, while also allowing for easy removal without the need to disengage bolts, nuts screws, or other fasteners.

While FIG. 8 shows the use of two holders for holding the light source (20) in place, the use of more or less than two holders is contemplated. In some embodiments, the light source may be held in place by at least one holder. In other embodiments, the light source may be held in place by at least two holders. In still other embodiments, the light source may be held in place by at least three holders.

Figure 9:
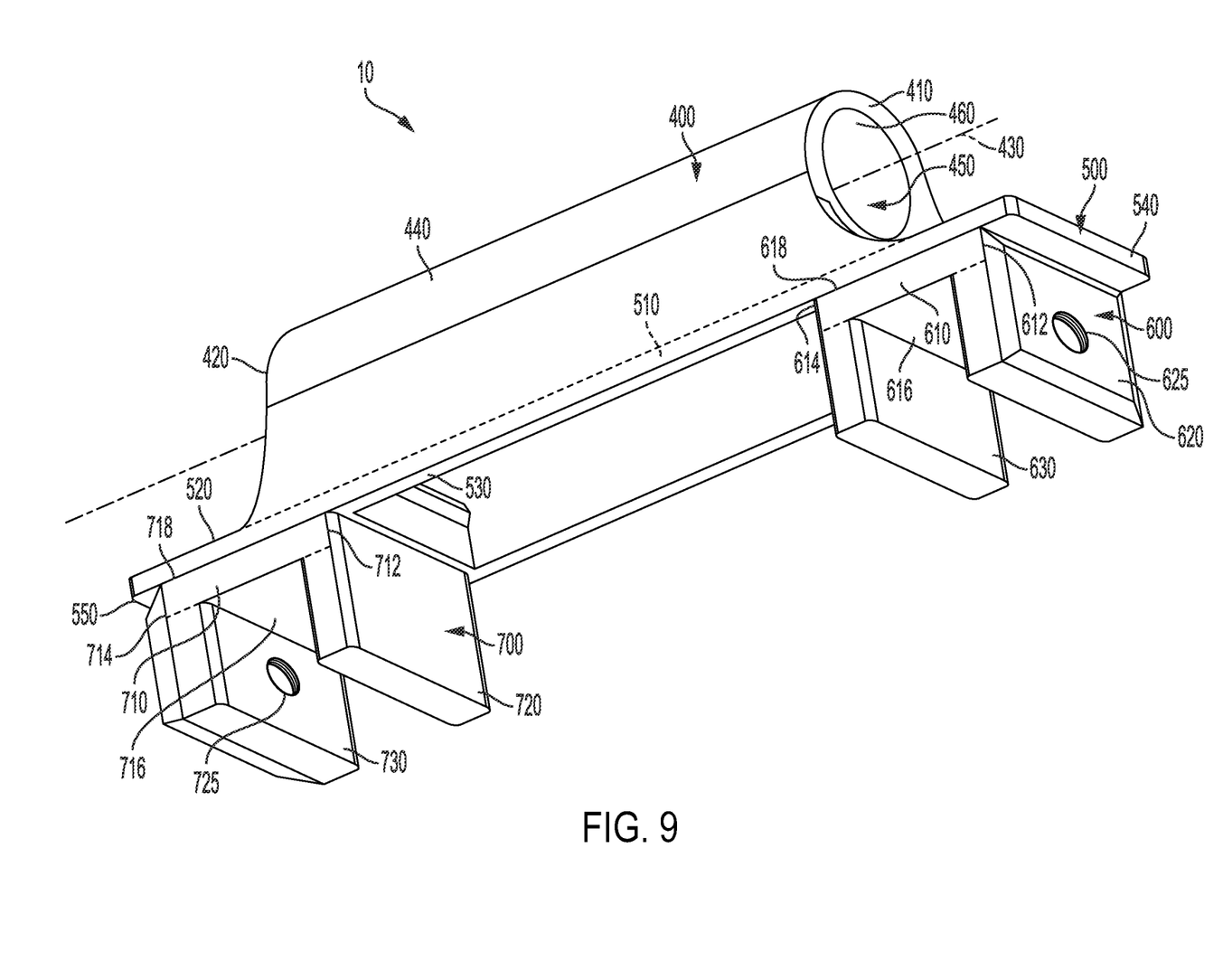
FIG. 9 is a perspective view of one embodiment of a holder for a light source.
Figure 10:
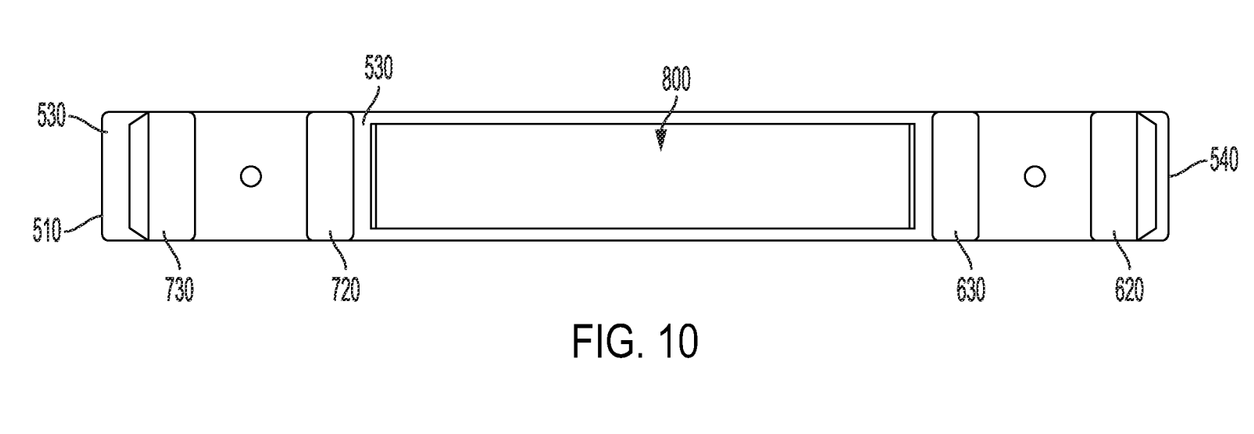
FIG. 10 is a front view of the embodiment of a holder for a light source shown in FIG. 9.
Figure 11:
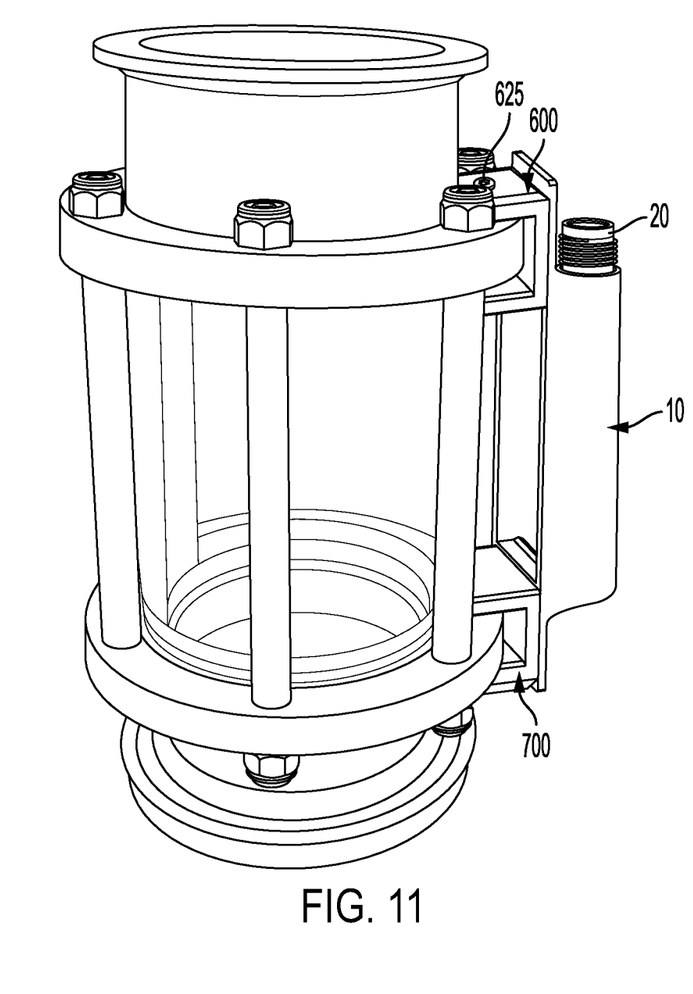
FIG. 11 is a perspective view of the embodiment of the holder for a light source shown in FIG. 9 in use holding a light source.

FIG. 9 to FIG. 11 show an alternative holder (10) for a light source (20). The holder shown in FIG. 9 to FIG. 11 may comprise a housing (400), a mounting base (500), a first bracket (600), and a second bracket (700).

FIG. 9 is the perspective view of the alternative holder (10). As shown in FIG. 9, the housing (400) has a housing first end (410) and a housing second end (420) with the housing second end being opposite the housing first end. The housing also has a housing longitudinal axis (430) running from the housing first end to the housing second end. The housing also has a housing outer surface (440). The housing may also have a housing first end access (460) which leads from the housing first end to a cavity (450). As shown in FIG. 11, when in use, the light source (20) may be disposed within the cavity.

In some embodiments, the cavity (450) may not extend all the way from the housing first end (410) to the housing second end (420). In such embodiments, the cavity can be thought of as a blind hole originating from the housing first end and extending a portion of the way along the housing length without reaching the housing second end. Alternatively, the cavity may extend all the way from the housing first end to the housing second end. In such embodiments, the cavity can be thought of as a through hole originating from the housing first end and extending through the housing second end which will comprise a housing second end access. Although not preferred, embodiments are envisioned in which the cavity originates from a housing second end access and does not extend all the way from the housing second end to the housing first end. In such embodiments, the cavity can be thought of as a blind hole originating from the housing second end and extending a portion of the way along the housing length without reaching the housing first end.

FIG. 9 also shows the holder (10) having a mounting base (500). As shown in FIG. 9, the mounting base has an outer perimeter (510) which defines a first planar surface (520) and a second planar surface (530) opposite the first planar surface. The mounting base also has a mounting base first end (540) and a mounting base second end (550) opposite the mounting base first end.

FIG. 9 also shows the first bracket (600). As shown in FIG. 9, the first bracket has a first bracket base (610), which has a first bracket base first end (612), a first bracket base second end (614), a first bracket inner surface (616), and a first bracket outer surface (618). The first bracket also has a first bracket first member (620) which extends from the first bracket inner surface at the first bracket base first end, and a first bracket second member (630) which extends from the first bracket outer surface at the first bracket base second end.

In some embodiments, the first bracket first member (620) will also include a first threaded hole (625) as shown in FIG. 9. When present, the first threaded hole may pass through the first bracket first member substantially parallel to or parallel to the housing longitudinal axis. The first threaded hole, when present, may be configured to receive a bolt, which may assist in connecting the holder to a visual flow indicator or sight flow indicator as described herein and shown in FIG. 11.

FIG. 9 also shows the second bracket (700). The second bracket may be of similar construction as the first bracket (600). As shown in FIG. 9, the second bracket has a second bracket base (710), which has a second bracket base first end (712), a second bracket base second end (714), a second bracket inner surface (716), and a second bracket outer surface (718). The second bracket also has a second bracket first member (720) which extends from the second bracket inner surface at the second bracket base first end, and a second bracket second member (730) which extends from the second bracket outer surface at the second bracket base second end.

Like the first bracket first member, in some embodiments, the second bracket second member (730) will also include a second threaded hole (725) as shown in FIG. 9. When present the second threaded hole may pass through the second bracket second member substantially parallel to or parallel to the housing longitudinal axis. The second threaded hole, when present, may be configured to receive a bolt, which may assist in connecting the holder to a visual flow indicator or sight flow indicator as described herein and shown in FIG. 11.

As shown in FIG. 9, a first portion of the housing outer surface (440) may be connected to the first planar surface (520) between the mounting base first end (540) and the mounting base second end (550). The connection between the housing outer surface and the first planar surface may be a permanent connection or a nonpermanent connection. Examples of permanent connections include a weld or manufacturing the housing and the mounting base from one integral piece of material. Examples of nonpermanent connections include fasteners such as screws, bolts, clamps, and the like which hold the housing adjacent to the mounting base, but can be removed to allow the housing to separate from the mounting base.

FIG. 9 also shows the first bracket outer surface (618) connected to the second planar surface (530) proximate with the mounting base first end (540). The connection between the first bracket outer surface and the second planar surface may be a permanent connection or a nonpermanent connection. Examples of permanent connections include a weld or manufacturing the mounting base and the first bracket from one integral piece of material. Examples of nonpermanent connections include fasteners such as screws, bolts, clamps, and the like which hold the mounting base adjacent to the first bracket, but can be removed to allow the mounting base to separate from the first bracket.

FIG. 9 also shows the second bracket outer surface (718) connected to the second planar surface (530) proximate with the mounting base second end (550). The connection between the second bracket outer surface and the second planar surface may be a permanent connection or a nonpermanent connection. Examples of permanent connections include a weld or manufacturing the mounting base and the second bracket from one integral piece of material. Examples of nonpermanent connections include fasteners such as screws, bolts, clamps, and the like which hold the mounting base adjacent to the second bracket, but can be removed to allow the mounting base to separate from the second bracket.

FIG. 10 shows a front view of the holder (10) of FIG. 9 facing the second planar surface (530). As shown in FIG. 10, the holder has an opening (800) which passes from the second planar surface through the first planar surface (520) and a portion of a sidewall of the housing. The opening provides an access to the cavity parallel to the housing longitudinal access, and allows light from the light source to pass out of the holder to illuminate the contents of a visual flow indicator or sight flow indicator. While the Figures show a rectangular shaped opening, the shape and size of the opening are not considered important, and will depend upon a variety of factors including the shape and size of the mounting base, the shape and size of the housing, the specific configuration of the light source, and the specific configuration of the visual flow indicator or sight flow indicator.

It is preferred, but not necessary, that at least the housing be made of an opaque material. In some embodiments, the entire holder will be made of an opaque material. When used, the opaque material is thought to provide a lampshade effect which directs light transmittance from the light source through the opening and provides improved illumination to the visual flow indicator or sight flow indicator.

FIG. 11 shows the holder (10) of FIG. 9 and FIG. 10 in use mounted to a visual flow indicator or sight flow indicator and containing a light source (20). As shown in FIG. 11, when in use, the light source (20) is disposed within the cavity. The first bracket (600) may be frictionally engaged to a first flange of the visual flow indicator or sight flow indicator. Similarly, the second bracket (700) may be frictionally engaged to a second flange of the visual flow indicator or sight flow indicator. In some embodiments, the engagement between the first bracket and the first flange may be assisted by use of a bolt passing through the first threaded hole (625) and tightened against the first flange. Similarly, the engagement between the second bracket and the second flange may be assisted by use of a bolt passing through the second threaded hole and tightened against the second flange. It should be noted that, when a bolt is used to assist in frictionally engaging one or more of the brackets to one or more of the flanges, the bolt does not pass into a hole in the flange(s).

The various embodiments of a holder described herein and shown in the drawings allow the light source to be quickly and easily mounted to a visual flow indicator or sight flow indicator by attaching the clips and/or brackets to a portion (bolts or flanges) of the visual flow indicator or sight flow indicator without having to modify the visual flow indicator or sight flow indicator to include additional holes for fasteners to pass into. The holders also allow the light source to be quickly and easily moved from one position on the visual flow indicator or sight flow indicator to another position without the need to undertake a time consuming process of removing bolts, screws or other fasteners. This allows the user to more quickly and easily illuminate different positions on the visual flow indicator or sight flow indicator.

What is claimed is:

1. A holder (10) for a light source (20) comprising:
    a first arm (100) having a first arm first end (110) and a first arm second end (120) opposite the first arm first end, said first arm first end comprising a first clip (130);
    a second arm (200) having a second arm first end (210) and a second arm second end (220) opposite the second arm first end, said second arm first end comprising a second clip (230);
    a pivot member (300) having a pivot member central axis (310), said pivot member central axis being substantially perpendicular to one or both of the first arm and/or the second arm; and
    wherein said first arm second end is connected to the pivot member at a first location, said second arm second end is connected to the pivot member at a second location, said first arm and said second arm are configured to pivot around the pivot member central axis, and said pivot member is configured to frictionally engage with the light source.

2. The holder of claim 1, wherein the first arm and the first clip are made of a first single integral piece of material.

3. The holder of claim 1, wherein the second arm and the second clip are made of a second single integral piece of material.

4. The holder of claim 1, wherein the first arm, the second arm, and the pivot member are made of one integral piece of material.

5. The holder of claim 1, wherein the first clip is slideably connected to the first arm.

6. The holder of claim 1, wherein the second clip is slideably connected to the second arm.

7. The holder of claim 1, wherein the first clip is configured to frictionally engage with a first mounting bolt (30) of a visual flow indicator or sight flow indicator, and the second clip is configured to frictionally engage with a second mounting bolt (40) of a visual flow indicator or sight flow indicator.

\* \* \* \* \*